(12) United States Patent
Jiang et al.

(10) Patent No.: US 10,210,433 B2
(45) Date of Patent: Feb. 19, 2019

(54) METHOD FOR EVALUATING QUALITY OF TONE-MAPPING IMAGE BASED ON EXPOSURE ANALYSIS

(71) Applicant: Ningbo University, Ningbo, Zhejiang (CN)

(72) Inventors: Gangyi Jiang, Zhejiang (CN); Yang Song, Zhejiang (CN); Fen Chen, Zhejiang (CN); Mei Yu, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 0 days.

(21) Appl. No.: 15/698,624

(22) Filed: Sep. 7, 2017

(65) Prior Publication Data

US 2017/0372175 A1   Dec. 28, 2017

(30) Foreign Application Priority Data

Jun. 8, 2017 (CN) .......................... 2017 1 0427465

(51) Int. Cl.
| | |
|---|---|
| G06K 9/62 | (2006.01) |
| G06K 9/46 | (2006.01) |
| G06K 9/03 | (2006.01) |
| G06T 7/00 | (2017.01) |
| H04N 1/00 | (2006.01) |
| H04N 5/235 | (2006.01) |

(52) U.S. Cl.
CPC .......... *G06K 9/6269* (2013.01); *G06K 9/036* (2013.01); *G06K 9/4642* (2013.01); *G06K 9/4652* (2013.01); *G06K 9/4661* (2013.01); *G06T 7/0002* (2013.01); *H04N 1/00002* (2013.01); *G06T 2207/20076* (2013.01); *G06T 2207/20081* (2013.01); *G06T 2207/20208* (2013.01); *G06T 2207/30168* (2013.01); *H04N 5/2355* (2013.01)

(58) Field of Classification Search
CPC .... G06K 9/6269; G06K 9/036; G06K 9/4652; G06K 9/4642; G06K 9/4661; H04N 1/00002; H04N 5/2355; G06T 7/0002; G06T 2207/20076; G06T 2207/20208; G06T 2207/30168; G06T 2207/20081
USPC ....................................................... 382/165
See application file for complete search history.

(56) References Cited

U.S. PATENT DOCUMENTS 9,275,445 B2 * 3/2016 Granados ................ G06T 5/009

* cited by examiner

*Primary Examiner* — Amandeep Saini (57) ABSTRACT

A method for evaluating quality of tone-mapping image based on exposure analysis is provided, which explores the exposure properties on each area of the high dynamic range image utilizing the pre-exposure method and divides the high dynamic range image into three parts of an easy overexposed area, an easy underexposed area and an easy natural-exposed area, wherein different quality characteristics are extracted in different areas, which is capable of ensuring that the follow-up quality characteristic extraction is more targeted. The present invention takes the difference of distortion between the tone-mapping image and the conventional image into account, and extracts image characteristics such as the abnormal exposure rate, the underexposed residual energy, the overexposed residual energy and the exposure color index, so as to accurately reflect the quality degradation of the tone-mapping image.

12 Claims, 1 Drawing Sheet

METHOD FOR EVALUATING QUALITY OF TONE-MAPPING IMAGE BASED ON EXPOSURE ANALYSIS

CROSS REFERENCE OF RELATED APPLICATION

The present application claims priority under 35 U.S.C. 119(a-d) to CN 201710427465.9, filed Jun. 8, 2017.

BACKGROUND OF THE PRESENT INVENTION

Field of Invention

The present invention relates to an image quality evaluation technique and more particularly to a method for evaluating quality of a tone-mapping image based on to exposure analysis.

Description of Related Arts

With the rapid development of image acquisition and imaging techniques, high dynamic range imaging technique has attracted more and more attentions because it is capable of displaying rich image scene information, and has gradually become the research focus in the image display area. However, at present, the conventional low dynamic range display devices are still generally being adopted by various kinds of image processing systems. Thus, the high dynamic range images have to be processed by tone-mapping operator in practical applications, in such a manner that it is capable of conforming to the conventional low dynamic range display devices. Due to the nonlinear mapping relationship of the conventional tone-mapping operator, the tone-mapping images generated by the tone-mapping operator inevitably degrade in quality. Therefore, how to evaluate the quality of the tone-mapping image accurately and effectively has a positive effect on the design of the tone-mapping operator and the development of the high dynamic range imaging system.

The quality evaluation of the tone-mapping image can be classified into two categories: subjective quality evaluation and objective quality evaluation. Since the visual information is finally received by human eyes, the subjective quality evaluation is the most reliable. However, the subjective quality evaluation is scored by the observer, which is time consuming and difficult to be integrated into the imaging system. In contrast, the objective quality evaluation is capable of regulating parameters of the system in real time, so as to achieve high-quality imaging system applications. Thus, the accurate and objective tone-mapping image quality evaluation method has excellent practical application value.

Currently, a series of methods for objectively evaluating quality of tone-mapping image have been proposed, wherein representative methods mainly include:

(1) Tone-mapped image quality index (TMQI), which combines two evaluation methods with excellent performance in the conventional image quality evaluation field: a multi-scale structure similarity algorithm and a natural image statistical algorithm; and makes improvements on this basis, so that it is capable of completing the quality evaluation of the tone-mapping image;

(2) Feature similarity for tone-mapped image (FSITM): based on the feature similarity (FSIM) algorithm which has excellent performance, the color space expansion model for the tone-mapping image is added, so that it is capable of achieving the quality evaluation of the tone-mapping image.

It can be seen from the description mentioned above that the existing quality evaluation method of the tone-mapping image is based on an improvement of the conventional image quality evaluation method. However, there is a great difference between the distortion phenomenon which causes the image quality degradation of the tone-mapping image and the distortion types in the conventional image quality evaluation. Thus, the methods which have good performance in the conventional image quality evaluation, such as the characteristic extraction method, are not capable of accurately describing the distortion in the tone-mapping image, so the subjective consistency of the existing method still needs improving.

SUMMARY OF THE PRESENT INVENTION

A technical problem to be solved by the present invention is to provide a method for evaluating quality of a tone-mapping image based on exposure analysis, which is capable of effectively improving correlation between the objective evaluation result and the subjective perceptual quality by human eyes.

In order to solve the technical problem mentioned above, a technical solution adopted by the present invention is as follows.

A method for evaluating quality of a tone-mapping image based on exposure analysis, comprises steps of:

(1) denoting $S_{HDR}$ as a high dynamic range image which is unprocessed with a width W and a height H, $S_{HDR}$ is an input signal of a conventional low dynamic range display devices; denoting $S_{TM}$ as a tone-mapping image generated from $S_{HDR}$ after processing with a tone-mapping operator, wherein $S_{TM}$ serves as a tone-mapping image to be evaluated;

(2) performing pre-exposure processing on a luminance component of $S_{HDR}$ under different exposure degrees, so as to generate an overexposed image and an underexposed image of the luminance component of $S_{HDR}$ which is respectively denoted as $EI_{over}$ and $EI_{under}$;

(3) dividing $EI_{over}$ into $$\lfloor \frac{W}{2^u} \rfloor \times \lfloor \frac{H}{2^v} \rfloor$$

non-overlapped image blocks with a size of $2^u \times 2^v$; then finding out overexposed image blocks from all image blocks of $EI_{over}$; forming all of the overexposed image blocks in $EI_{over}$ into an overexposed area which is denoted as $R_{over}^{Exposure}$; wherein $\lfloor \; \rfloor$ is a floor operation symbol, u and v are identical integer selected from an interval of[2, 5], wherein in the preferred embodiment, u=v=3, i.e., a size of the image block is 8×8;

dividing $EI_{under}$ into $$\lfloor \frac{W}{2^u} \rfloor \times \lfloor \frac{H}{2^v} \rfloor$$

non-overlapped image blocks with a size of $2^u \times 2^v$; then finding out underexposed image blocks from all image blocks of $EI_{under}$; forming all of the underexposed image blocks in $EI_{under}$ into an underexposed image area which is denoted as $R_{under}^{Exposure}$;

(4) dividing $S_{HDR}$ into $$\lfloor \tfrac{W}{2^u} \rfloor \times \lfloor \tfrac{H}{2^v} \rfloor$$

non-overlapped image blocks with a size of $2^u \times 2^v$; then, according to $R_{over}^{Exposure}$ and $R_{under}^{Exposure}$, dividing $S_{HDR}$ into an easy overexposed area, an easy underexposed area and an easy normal-exposed area, which are respectively denoted as $R_{over}$, $R_{under}$ and $R_{normal}$;

(5) dividing $S_{TM}$ into $$\lfloor \tfrac{W}{2^u} \rfloor \times \lfloor \tfrac{H}{2^v} \rfloor$$

non-overlapped image blocks with a size of $2^u \times 2^v$; then denoting an area corresponding to $R_{over}$ in $S_{TM}$ as a tone-mapping easy overexposed area $R_1$; then denoting an area corresponding to $R_{under}$ in $S_{TM}$ as a tone-mapping easy underexposed area $R_2$; denoting an area corresponding to $R_{normal}$ in $S_{TM}$ as a tone-mapping easy normal-exposed area $R_3$;

(6) judging if there is overexposure in each of the image blocks in $R_1$, if yes, determining image blocks which are overexposed as tone-mapping overexposed blocks, then counting a total number of the tone-mapping overexposed blocks which is denoted as $N_{over}^{TM}$;

judging if there is underexposure in each of the image blocks in $R_2$, if yes, determining image blocks which are underexposed as tone-mapping underexposed blocks, then counting a total number of the tone-mapping underexposed blocks which is denoted as $N_{under}^{TM}$;

(7) according to $N_{over}^{TM}$ and $N_{under}^{TM}$, calculating an abnormal exposure rate of $S_{TM}$ which is denoted as $\eta_{abnormal}$, $$\eta_{abnormal} = \frac{N_{over}^{TM} + N_{under}^{TM}}{N_{R_1} + N_{R_2}};$$

wherein $N_{R_1}$ represents a total number of image blocks in $R_1$; $N_{R_2}$ represents a total number of image blocks in $R_2$;

(8) calculating an overexposed residual energy of $R_1$, which is denoted as $E_1$, wherein $$E_1 = \frac{\sum_{n=1}^{N_{R_1}} (\mu_{1,n} - L_{over}^E)^2}{N_{R_1}};$$

calculating an underexposed residual energy of $R_2$, which is denoted as $E_2$, wherein $$E_2 = \frac{\sum_{n'=1}^{N_{R_2}} (\mu_{2,n'} - L_{under}^E)^2}{N_{R_2}};$$

wherein $\mu_{1,n}$ represents an average value of pixel values of all pixels in a corresponding area of an nth image blocks in $R_1$ in an luminance component of $S_{TM}$; $\mu_{2,n'}$ represents an average value of pixel values of all pixels in a corresponding area of an n'th image blocks in $R_2$ in the luminance component of $S_{TM}$; $L_{over}^E$ is an extreme overexposure brightness value, $L_{over}^E=255$; $L_{under}^E$ is an extreme underexposure brightness value, $L_{under}^E=0$;

(9) converting $R_3$ from an RGB (red green blue) color space into an opponent color space, which is denoted as $R_3'$; then calculating an average value and a variance of a component value of a red-green channel of all pixels in $R_3'$, which are respectively denoted as $\mu_{rg}$ and $\sigma_{rg}$; calculating an average value and a variance of a component value of yellow-blue channel of all pixels in $R_3'$ which are respectively denoted as $\mu_{yb}$ and $\sigma_{yb}$; then calculating an exposure color index of $R_3'$, which is denoted as $C_3$, $C_3 = \sqrt{\sigma_{rg}^2 + \sigma_{yb}^2} + \omega_c \times \sqrt{\mu_{rg}^2 + \mu_{yb}^2}$; wherein $\omega_c$ represents weighing of an average color value;

(10) obtaining a characteristic vector of $S_{TM}$, which is denoted as $\overline{F_{TM}}$, $\overline{F_{TM}} = [\eta_{abnormal}, E_1, E_2, C_3]$, wherein symbol [ ] is a vector symbol;

(11) testing $\overline{F_{TM}}$ according to a support vector regression training model to obtain an objective quality evaluation predictive value of $S_{TM}$, which is denoted as $Q=f(X_{dis})$, $f(X_{dis})=(V_{best})^T \varphi(X_{dis})+b_{best}$; wherein Q is a function of $X_{dis}$, $f( )$ is an expression form of function, $X_{dis}$ is for representing $\overline{F_{TM}}$, $V_{best}$ and $b_{best}$ are an optimal weight vector and an optimal bias of the support vector regression training model, $(V_{best})^T$ is a transposition of $V_{best}$, $\varphi(X_{dis})$ is a linear function of $X_{dis}$.

An obtaining process of $EI_{over}$ and $EI_{over}$ in the step (2) is: a pixel value of a pixel at a coordinate position of (x,y) in $IE_{over}$ is denoted as $EI_{over}(x,y)$ a pixel value of a pixel at a coordinate position of (x,y) in $EI_{under}$ is denoted as $EI_{under}(x,y)$, $$EI_{over}(x,y) = \lfloor 2^{F_{over}} \times I_{HDR}(x,y) \rfloor^{\frac{1}{\gamma}},$$

$$EI_{under}(x,y) = \lfloor 2^{F_{under}} \times I_{HDR}(x,y) \rfloor^{\frac{1}{\gamma}},$$

wherein $1 \leq x \leq W$, $1 \leq y \leq H$, symbol $\lfloor \ \rfloor$ is a floor operation symbol, $F_{over}$ represents a sunlight parameter corresponding to $EI_{over}$, $F_{over}=8$, $F_{under}$ represents a sunlight parameter corresponding to $EI_{under}$, $F_{under}=0$, $I_{HDR}(x,y)$ represents a pixel value of a pixel at a coordinate position of (x,y) in a luminance component $I_{HDR}$ of $S_{HDR}$, $\gamma$ is a gamma correction parameter.

In the step (3), a specific process of finding out overexposed image blocks from all the image blocks of $EI_{over}$ is: for an ith image block in $EI_{over}$, calculating an average value of pixel values of all pixels in the ith image block, if the average value of pixel values of all pixels in the ith image block is greater than an overexposed threshold $TH_{over}$, the ith image block is determined as an overexposed image block; wherein $$1 \leq i \leq \lfloor \tfrac{W}{2^u} \rfloor \times \lfloor \tfrac{H}{2^v} \rfloor;$$

wherein in the step (3), a specific process of finding out overexposed image blocks from all the image blocks of $EI_{under}$ is: for an ith image block in $EI_{under}$, calculating an average value of pixel values of all pixels in the ith image block, if the average value of pixel values of all pixels in the ith image block is smaller than an underexposed threshold $TH_{under}$, the ith image block is determined as an underexposed image block.

A value of the overexposed threshold is $TH_{over}=\alpha_{over}\times \overline{EI_{over}}$, a value of the underexposed threshold is $TH_{under}=\alpha_{under}\times\overline{EI_{under}}$; wherein $\alpha_{over}$ is an overexposed control factor, $\alpha_{over}=0.8$; $\overline{EI_{over}}$ represents the average value of the pixel values of all pixels in $EI_{over}$, $\alpha_{under}$ is an underexposed control factor, $\alpha_{under}=1.2$, $\overline{EI_{under}}$ represents the average value of the pixel values of all pixels in $EI_{under}$.

A determining process of $R_{over}$、$R_{under}$ and $R_{normal}$ in the step (4) comprising steps of:

(4)-1a: defining current image block to be processed in $S_{HDR}$ as a current image block;

(4)-1b: defining the current image block as an ith image block in $S_{HDR}$ which is denoted as $B_{HDR}^{\ i}$, wherein $$1 \le i \le \left\lfloor \frac{W}{2^u} \right\rfloor \times \left\lfloor \frac{H}{2^v} \right\rfloor;$$

(4)-1c: if $B_{over}^{\ i}\in R_{over}^{Exposure}$ and $B_{under}^{\ i}\notin R_{under}^{Exposure}$, determining $B_{HDR}^{\ i}$ as an easy overexposed block; if $B_{under}^{\ i}\in R_{under}^{Exposure}$ and $B_{over}^{\ i}\notin R_{over}^{Exposure}$, determining $B_{HDR}^{\ i}$ as an easy underexposed block; if $B_{over}^{\ i}\in R_{over}^{Exposure}$ and $B_{under}^{\ i}\notin R_{under}^{Exposure}$, determining $B_{HDR}^{\ i}$ as an easy normal-exposed block; wherein $B_{over}^{\ i}$ represents an ith image blocks in $EI_{over}$, $B_{under}^{\ i}$ represents an ith image blocks in $EI_{under}$; and (4)-1d: taking a next image block to be processed in $S_{HDR}$ as a current image block, then returning to (4)-1b and performing continuously until all image blocks in $S_{HDR}$ are processed, then taking an area formed by all easy overexposed blocks in $S_{HDR}$ as an easy overexposed area $R_{over}$, taking an area formed by all easy underexposed blocks in $S_{HDR}$ as an easy underexposed area $R_{under}$; and taking an area formed by all easy normal-exposed blocks in $S_{HDR}$ as an easy normal-exposed area $R_{normal}$.

In the step (6), a judging process of the tone-mapping overexposed block in $R_1$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped image blocks with a size of $2^u\times 2^v$, wherein an nth image blocks in $R_1$ is denoted as $R_{1,n}$, calculating an average value and a standard deviation of pixel values of all pixels in an image block corresponding to $R_{1,n}$ in a luminance component of $S_{TM}$, which are respectively denoted as $\mu_{1,n}$ and $\sigma_{1,n}$; if $\mu_{1,nb}>200$ and $\sigma_{1,n}<\sigma_{TM}$, $R_{1,n}$ is judged as a tone-mapping overexposed block; wherein $1\le n\le N_{R_1}$, $N_{R_1}$ represents a total number of image blocks in $R_1$, $\sigma_{TM}$ represents a standard deviation of pixel values of all pixels in the luminance component of $S_{TM}$;

In the step (6), a judging process of the tone-mapping underexposed block in $R_2$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped image blocks with a size of $2^u\times 2^v$, wherein an n'th image blocks in $R_2$ is denoted as $R_{2,n'}$, calculating an average value and a standard deviation of pixel values of all pixels in an image block corresponding to $R_{2,n'}$ in a luminance component of $S_{TM}$, which are respectively denoted as $\mu_{2,n'}$ and $\sigma_{2,n'}$; if $\mu_{2,n'}<50$ and $\sigma_{2,n'}<\sigma_{TM}$, $R_{2,n'}$ is judged as a tone-mapping underexposed block; wherein $1\le n\le N_{R_2}$, $N_{R_2}$ represents a total number of image blocks in $R_2$, $\sigma_{TM}$ represents the standard deviation of pixel values of all pixels in the luminance component of $S_{TM}$.

In the step (11), a process of obtaining a support vector regression training model comprising steps of:

(11)-1a: selecting $n_{test}$ high dynamic range images; then generating $N_{test}$ tone-mapping images by different tone-mapping operators; taking a set of the $N_{test}$ tone-mapping images as a training image set, which is denoted as $D_{test}$; then utilizing a subjective quality evaluation method to evaluate the tone-mapping images in $D_{test}$ to obtain a subjective quality evaluation score of each tone-mapping image in $D_{test}$; denoting a subjective quality evaluation score of an mth tone-mapping image in $D_{test}$ as $DMOS_m$; then obtaining a characteristic vector of each tone-mapping image in $D_{test}$ in an identical way as a process of the step (1) to (10), denoting a characteristic vector of an mth tone-mapping image in $D_{test}$ as $\overline{F_{test,m}}$; wherein $n_{test}>1$; $1\le m\le N_{test}$; $1\le DMOS_m\le 100$;

(11)-1b: training each subjective quality evaluation score and characteristic vector of all tone-mapping images in $D_{test}$ utilizing support vector regression, so as to make a regression function has a minimum error to the subjective quality evaluation scores through training, fitting to obtain an optimal weight vector $V_{best}$ and an optimal bias $b_{best}$; then obtaining a support vector regression training model utilizing $V_{best}$ and $b_{best}$.

Compared with the conventional art, the present invention has advantages as follows.

The method of the present invention explores the exposure properties on each area of the high dynamic range image utilizing the pre-exposure method and divides the high dynamic range image into three parts of an easy overexposed area, an easy underexposed area and an easy natural-exposed area, wherein different quality characteristics are extracted in different areas, which is capable of ensuring that the follow-up quality characteristic extraction is more targeted. The present invention takes the difference of distortion between the tone-mapping image and the conventional image into account, and extracts image characteristics in the tone-mapping images which is different from the conventional image quality evaluation such as the abnormal exposure rate, the underexposed residual energy, the overexposed residual energy and the exposure color index, so as to make the characteristics extracted capable of accurately reflecting the quality degradation of the tone-mapping image.

The method of the present invention takes full account of the difference between the tone-mapping image and the conventional images, and makes innovation and improvement from two aspects of exposure area segmentation and the quality feature extraction, and therefore improving the correlation between the objective evaluation result obtained by the method of the present invention and the subjective perception of human eyes.

These and other objectives, features, and advantages of the present invention will become apparent from the following detailed description, the accompanying drawings, and the appended claims.

DETAILED DESCRIPTION OF THE PREFERRED EMBODIMENT

Further description of the present invention is illustrated combining with the accompanying drawings and the preferred embodiments.

Figure 1:
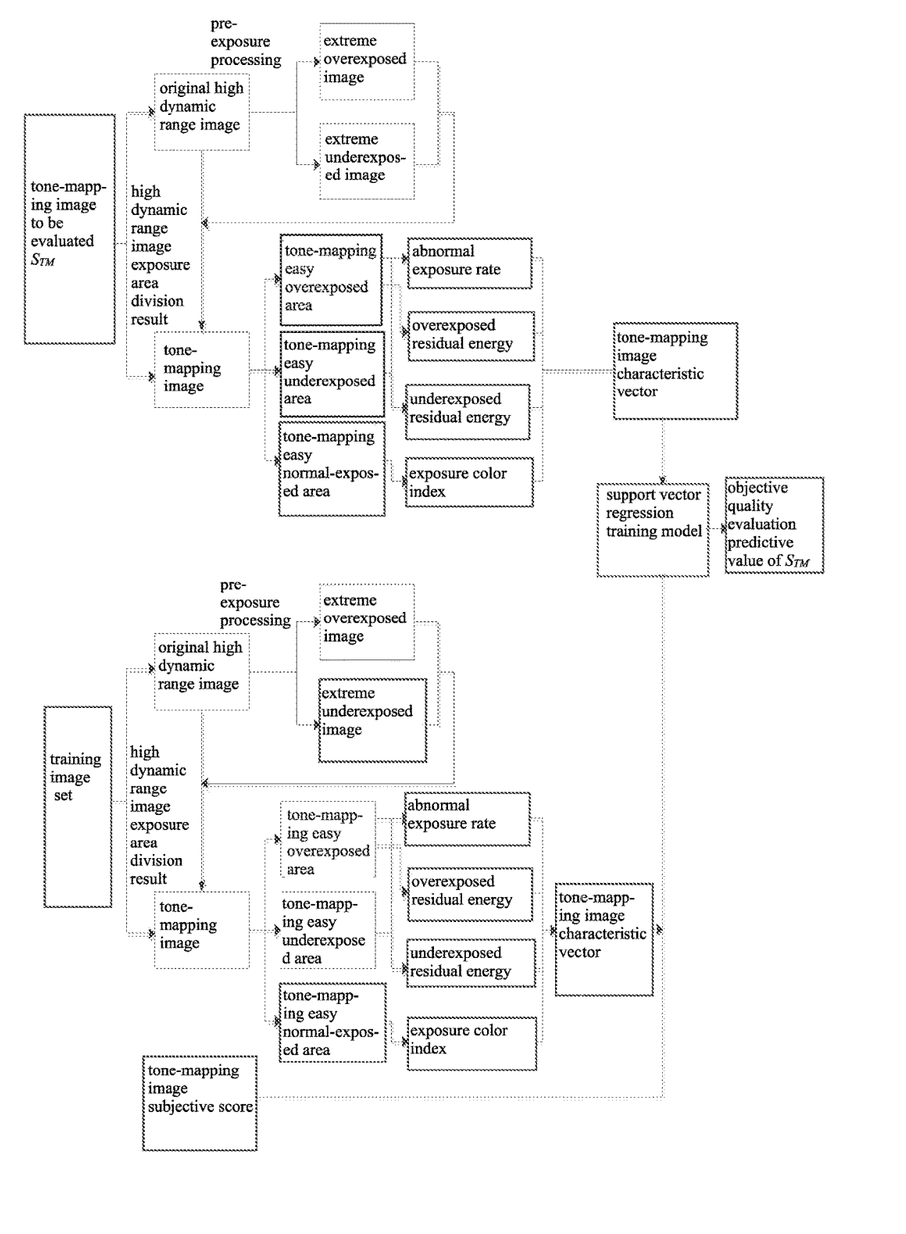
The Figure is an overall flow chart of a method according to a preferred embodiment of the present invention.

An overall flow chart is as shown in the Figure, the present invention provides a method for evaluating quality of a tone-mapping image based on exposure analysis, comprising steps of:

(1) denoting $S_{HDR}$ as a high dynamic range image which is unprocessed with a width W and a height H, $S_{HDR}$ is an input signal of a conventional low dynamic range display devices; denoting $S_{TM}$ as a tone-mapping image generated from $S_{HDR}$ after processing with a tone-mapping operator, wherein $S_{TM}$ serves as a tone-mapping image to be evaluated;

(2) performing pre-exposure processing on a luminance component of $S_{HDR}$ under different exposure degrees, so as to generate an overexposed image and an underexposed image of the luminance component of $S_{HDR}$ which is respectively denoted as $EI_{over}$ and $EI_{under}$, here, both $EI_{over}$ and $EI_{under}$ are extreme exposure condition images;

wherein in the preferred embodiment, an obtaining process of $EI_{over}$ and $EI_{over}$ in the step (2) is: a pixel value of a pixel at a coordinate position of (x,y) in $EI_{over}$ is denoted as $EI_{over}$ (x,y), a pixel value of a pixel at a coordinate position of (x,y) in $EI_{under}$ is denoted as $EI_{under}$ (x,y), $$EI_{over}(x, y) = \lfloor 2^{F_{over}} \times I_{HDR}(x, y) \rfloor^{\frac{1}{\gamma}},$$

$$EI_{under}(x, y) = \lfloor 2^{F_{under}} \times I_{HDR}(x, y) \rfloor^{\frac{1}{\gamma}},$$

wherein 1≤x≤W, 1≤y≤H, symbol ⌊ ⌋ is a floor operation symbol, $F_{over}$ represents a sunlight parameter corresponding to $EI_{over}$, $F_{over}$=8, $F_{under}$ represents a sunlight parameter corresponding to $EI_{under}$, $F_{under}$=0, $I_{HDR}$ (x,y) represents a pixel value of a pixel at a coordinate position of (x,y) in a luminance component $I_{HDR}$ of $S_{HDR}$, γ is a gamma correction parameter; wherein γ=2.2 in the preferred embodiment;

(3) dividing $EI_{over}$ into $$\left\lfloor \frac{W}{2^u} \right\rfloor \times \left\lfloor \frac{H}{2^v} \right\rfloor$$

non-overlapped image blocks with a size of $2^u \times 2^v$; then finding out overexposed image blocks from all image blocks of $EI_{over}$; forming all of the overexposed image blocks in $EI_{over}$ into an overexposed area which is denoted as $R_{over}^{Exposure}$; wherein ⌊ ⌋ is a floor operation symbol, u and v are identical integer selected from an interval of$^{[2, 5]}$.

dividing $EI_{under}$ into $$\left\lfloor \frac{W}{2^u} \right\rfloor \times \left\lfloor \frac{H}{2^v} \right\rfloor$$

non-overlapped image blocks with a size of $2^u \times 2^v$; then finding out underexposed image blocks from all image blocks of $EI_{under}$; forming all of the underexposed image blocks in $EI_{under}$ under into an underexposed image area which is denoted as $R_{under}^{Exposure}$;

in the preferred embodiment, in the step (3), a specific process of finding out overexposed image blocks from all the image blocks of $EI_{over}$ is: for an ith image block in $EI_{over}$, calculating an average value of pixel values of all pixels in the ith image block, if the average value of pixel values of all pixels in the ith image block is greater than an overexposed threshold $TH_{over}$, the ith image block is determined as an overexposed image block; wherein $$1 \le i \le \left\lfloor \frac{W}{2^u} \right\rfloor \times \left\lfloor \frac{H}{2^v} \right\rfloor;$$

in the step (3), a specific process of finding out underexposed image blocks from all the image blocks of $EI_{under}$ is: for an ith image block in $EI_{under}$, calculating an average value of pixel values of all pixels in the ith image block, if the average value of pixel values of all pixels in the ith image block is smaller than an underexposed threshold $TH_{under}$, the ith image block is determined as an underexposed image block;

wherein a value of the overexposed threshold is $TH_{over}=\alpha_{over} \times \overline{EI_{over}}$, a value of the underexposed threshold is $TH_{under}=\alpha_{under} \times \overline{EI_{under}}$; wherein $\alpha_{over}$ is an overexposed control factor, $\alpha_{over}$=0.8; $\overline{EI_{over}}$ represents the average value of the pixel values of all pixels in $EI_{over}$, $\alpha_{under}$ is an underexposed control factor, $\alpha_{under}$=1.2, $\overline{EI_{under}}$ represents the average value of the pixel values of all pixels in $EI_{under}$;

(4) dividing $S_{HDR}$ into $$\left\lfloor \frac{W}{2^u} \right\rfloor \times \left\lfloor \frac{H}{2^v} \right\rfloor$$

non-overlapped image blocks with a size of $2^u \times 2^v$; then, according to $R_{over}^{Exposure}$ and $R_{under}^{Exposure}$, dividing $S^{HDR}$ into an easy overexposed area, an easy underexposed area and an easy normal-exposed area, which are respectively denoted as $R_{over}$, $R_{under}$ and $R_{normal}$;

In the preferred embodiment, a determining process of $R_{over}$, $R_{under}$ and $R_{normal}$ in the step (4) comprising steps of:

(4)-1a: defining current image block to be processed in $S_{HDR}$ as a current image block;

(4)-1b: defining the current image block as an ith image block in $S_{HDR}$ which is denoted as $B_{HDR}^i$, wherein $$1 \le i \le \left\lfloor \frac{W}{2^u} \right\rfloor \times \left\lfloor \frac{H}{2^v} \right\rfloor;$$

(4)-1c: if $B_{over}^i \in R_{over}^{Exposure}$ and $B_{under}^i \notin R_{under}^{Exposure}$, determining $B_{HDR}^i$ as an easy overexposed block; if $B_{under}^i \in R_{under}^{Exposure}$ and $B_{over}^i \notin R_{over}^{Exposure}$, determining $B_{HDR}^i$ as an easy underexposed block; if $B_{over}^i \in R_{over}^{Exposure}$ and $B_{under}^i \in R_{under}^{Exposure}$, determining $B_{HDR}^i$ as an easy normal-exposed block; wherein $B_{over}^i$ represents an ith image blocks in $EI_{over}$, $B_{under}^i$ represents an ith image blocks in $EI_{under}$;

(4)-1d: taking a next image block to be processed in $S_{HDR}$ as a current image block, then returning to (4)-1b and performing continuously until all image blocks in $S_{HDR}$ are processed, then taking an area formed by all easy overexposed blocks in $S_{HDR}$ as an easy overexposed area $R_{over}$, taking an area formed by all easy underexposed blocks in $S_{HDR}$ as an easy underexposed area $R_{under}$; and taking an area formed by all easy normal-exposed blocks in $S_{HDR}$ as an easy normal-exposed area $R_{normal}$;

(5) dividing $S_{TM}$ into $$\left\lfloor \frac{W}{2^u} \right\rfloor \times \left\lfloor \frac{H}{2^v} \right\rfloor$$

non-overlapped image blocks with a size of $2^u \times 2^v$; then denoting an area corresponding to $R_{over}$ in $S_{TM}$ as a tone-mapping easy overexposed area $R_1$; then denoting an area corresponding to $R_{under}$ in $S_{TM}$ as a tone-mapping easy underexposed area $R_2$; denoting an area corresponding to $R_{normal}$ in $S_{TM}$ as a tone-mapping easy normal-exposed area $R_3$;

(6) judging if there is overexposure in each of the image blocks in $R_1$, if yes, determining image blocks which are overexposed as tone-mapping overexposed blocks, then counting a total number of the tone-mapping overexposed blocks which is denoted as $N_{over}^{TM}$;

judging if there is underexposure in each of the image blocks in $R_2$, if yes, determining image blocks which are underexposed as tone-mapping underexposed blocks, then counting a total number of the tone-mapping underexposed blocks which is denoted as $N_{under}^{TM}$;

wherein in the step (6), a judging process of the tone-mapping overexposed block in $R_1$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped image blocks with a size of $2^u \times 2^v$, wherein an nth image blocks in $R_1$ is denoted as $R_{1,n}$, calculating an average value and a standard deviation of pixel values of all pixels in an image block corresponding to $R_{1,n}$ in a luminance component of $S_{TM}$ which are respectively denoted as $\mu_{1,n}$ and $\sigma_{1,n}$; if $\mu_{1,n} > 200$ and $\sigma_{1,n} < \sigma_{TM}$, $R_{1,n}$ is judged as a tone-mapping overexposed block; wherein $1 \leq n \leq N_{R_1}$, $N_{R_1}$ represents a total number of image blocks in $R_1$, $\sigma_{TM}$ represents a standard deviation of pixel values of all pixels in the luminance component of $S_{TM}$;

wherein in the step (6), a judging process of the tone-mapping underexposed block in $R_2$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped image blocks with a size of $2^u \times 2^v$, wherein an n'th image blocks in $R_2$ is denoted as $R_{2,n'}$, calculating an average value and a standard deviation of pixel values of all pixels in an image block corresponding to $R_{2,n'}$ in a luminance component of $S_{TM}$, which are respectively denoted as $\mu_{2,n'}$ and $\sigma_{2,n'}$, if $\mu_{2,n'} < 50$ and $\sigma_{2,n'} < \sigma_{TM}$, $R_{2,n'}$ is judged as a tone-mapping underexposed block; wherein $1 \leq n' \leq N_{R_2}$, $N_{R_2}$ represents a total number of image blocks in $R_2$, $\sigma_{TM}$ represents the standard deviation of pixel values of all pixels in the luminance component of $S_{TM}$;

(7) according to $N_{over}^{TM}$ and $N_{under}^{TM}$, calculating an abnormal exposure rate of $S_{TM}$ which is denoted as $\eta_{abnormal}$, $$\eta_{abnormal} = \frac{N_{over}^{TM} + N_{under}^{TM}}{N_{R_1} + N_{R_2}};$$

wherein $N_{R_1}$ represents a total number of image blocks in $R_1$; $N_{R_2}$ represents a total number of image blocks in $R_2$;

(8) calculating an overexposed residual energy of $R_1$, which is denoted as $E_1$, wherein $$E_1 = \frac{\sum_{n=1}^{N_{R_1}} (\mu_{1,n} - L_{over}^E)^2}{N_{R_1}};$$

calculating an underexposed residual energy of $R_2$, which is denoted as $E_2$, wherein $$E_2 = \frac{\sum_{n'=1}^{N_{R_2}} (\mu_{2,n'} - L_{under}^E)^2}{N_{R_2}};$$

wherein $\mu_{1,n}$ represents an average value of pixel values of all pixels in a corresponding area of an nth image blocks in $R_1$ in an luminance component of $S_{TM}$; $\mu_{2,n'}$ represents an average value of pixel values of all pixels in a corresponding area of an n'th image blocks in $R_2$ in the luminance component of $S_{TM}$; $L_{over}^E$ is an extreme overexposure brightness value, $L_{over}^E = 255$; $L_{under}^E$ is an extreme underexposure brightness value, $L_{under}^E = 0$;

(9) converting $R_3$ from an RGB (red green blue) color space into an opponent color space, which is denoted as $R_3'$; then calculating an average value and a variance of a component value of a red-green channel of all pixels in $R_3'$; which are respectively denoted as $\mu_{rg}$ and $\sigma_{rg}$; calculating an average value and a variance of a component value of yellow-blue channel of all pixels in $R_3'$, which are respectively denoted as $\mu_{yb}$ and $\sigma_{yb}$; then calculating an exposure color index of $R_3'$, which is denoted as $C_3$, $C_3 = \sqrt{\sigma_{rg}^2 + \sigma_{yb}^2} + \omega_c \times \sqrt{\mu_{rg}^2 + \mu_{yb}^2}$; wherein $\omega_c$ represents weighing of an average color value, wherein in the preferred embodiment $\omega_c = 0.3$ (10) obtaining a characteristic vector of $S_{TM}$, which is denoted as $\overline{F_{TM}}$, $\overline{F_{TM}} = [\eta_{abnormal}, E_1, E_2, C_3]$, wherein symbol [ ] is a vector symbol;

(11) testing $\overline{F_{TM}}$ according to a support vector regression training model to obtain an objective quality evaluation predictive value of $S_{TM}$, which is denoted as $Q = f(X_{dis})$, $f(X_{dis}) = (V_{best})^T \varphi(X_{dis}) + b_{best}$; wherein $Q$ is a function of $X_{dis}$, $f( )$ is an expression form of function, $X_{dis}$ is inputting for representing $\overline{F_{TM}}$, $V_{best}$ and $b_{best}$ are an optimal weight vector and an optimal bias of the support vector regression training model, $(V_{best})^T$ is a transposition of $V_{best}$, $\varphi(X_{dis})$ near function of $X_{dis}$.

wherein in the step (11), a process of obtaining a support vector regression training model comprising steps of:

(11)-1a: selecting $n_{test}$ high dynamic range images; then generating $N_{test}$ tone-mapping images by different tone-mapping operators; taking a set of the $N_{test}$ tone-mapping images as a training images set, which is denoted as $D_{test}$, then utilizing a subjective quality evaluation method to obtain a subjective quality evaluation score of each tone-mapping image in $D_{test}$; denoting a subjective quality evaluation score of an mth tone-mapping image in $D_{test}$ as $DMOS_m$; then obtaining a characteristic vector of each tone-mapping image in $D_{test}$ in an identical way as a process of the step (1) to (10), denoting a characteristic vector of an mth tone-mapping image in $D_{test}$ as $\overline{F_{test,m}}$; wherein $n_{test}>1$; $1 \le m \le N_{test}$; $1 \le DMOS_m \le 100$;

(11)-1b: training each subjective quality evaluation score and characteristic vector of all tone-mapping images in $D_{test}$ utilizing support vector regression, so as to make a regression function has a minimum error to the subjective quality evaluation scores through training, fitting to obtain an optimal weight vector $V_{best}$ and an optimal bias $b_{best}$; then obtaining a support vector regression training model utilizing $V_{best}$ and $b_{best}$.

In the preferred embodiment, the TMID tone-mapping image database, TMID database for short, provided by the LIVE laboratory of the University of Texas at Austin is selected for testing. The TMID database comprises 15 original high dynamic range images of different scene types, and 8 different tone-mapping operators are adopted for performing tone-mapping process on each of the original high dynamic range images, and 120 tone-mapping images are generated. During the test process, the 120 tone-mapping images are randomly classified into two parts including a training image set and a test image set. According to the process of the step (1) to the step (11), identical method is adopted to calculate for obtaining the objective quality evaluation predictive value of each tone-mapping image in the test image set, then the objective quality evaluation predictive values and the corresponding subjective quality evaluation scores (in the preferred embodiment, Differential Mean Opinion Score (DMOS) is adopted as the subjective quality evaluation score) are performed with four parameter logistic function non-linear fitting, so as to finally obtain the index value between the objective evaluation result and the subjective perception. Here, three commonly used objective parameters of the evaluation method for image quality are adopted for serving as the evaluation index: Correlation coefficient (CC), Spearman Rank Order Correlation coefficient (SROCC) and Rooted Mean Squared Error (RMSE). Values of CC and ROCC are at a range of [0,1], wherein the more closer are the values of CC and ROCC to 1, the more accurate is the objective evaluation results; vice versa, the less accurate. The CC, SROCC and RMSE indexes representing the evaluation performances of the method of the present invention are as shown in Table. 1. It can be seen from the data listed in the Table. 1 that there is a good correlation between the objective quality evaluation predicted value of the tone-mapping image obtained by the method of the present invention and the subjective quality evaluation score; wherein the value of CC reaches 0.8802, the value of SROCC reaches 0.8512 and the value of RMSE is as low as 0.8342. The results indicate that the objective evaluation result of the method of the present invention is consistent with the result of subjective perception of human eyes, and the validity of the method of the present invention is fully explained.

TABLE 1

Performance indexes of correlation between the objective quality evaluation predicted value and the subjective quality evaluation score of the tone-mapping image in the test image set calculated by the method of the present invention.

| Index | CC | SROCC | RMSE |
| --- | --- | --- | --- |
| Final result | 0.8802 | 0.8512 | 0.8342 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for evaluating quality of a tone-mapping image based on exposure analysis, comprising steps of:
    (1) denoting $S_{HDR}$ as a high dynamic range image which is unprocessed with a width W and a height H, $S_{HDR}$ is an input signal of a conventional low dynamic range display devices; denoting $S_{TM}$ as a tone-mapping image generated from $S_{HDR}$ after processing with a tone-mapping operator, wherein $S_{TM}$ serves as a tone-mapping image to be evaluated;
    (2) performing pre-exposure processing on a luminance component of $S_{HDR}$ under different exposure degrees, so as to generate an overexposed image and an underexposed image of the luminance component of $S_{HDR}$, which is respectively denoted as $EI_{over}$ and $EI_{under}$;
    (3) dividing $EI_{over}$ into $$\left\lfloor \frac{W}{2^u} \right\rfloor \times \left\lfloor \frac{H}{2^v} \right\rfloor$$

non-overlapped image blocks with a size of $2^u \times 2^v$; then finding out overexposed image blocks from all image blocks of $EI_{over}$; forming all of the overexposed image blocks in $EI_{over}$ into an overexposed area which is denoted as $R_{over}^{Exposure}$; wherein $\lfloor \ \rfloor$ is a floor operation symbol, u and v are identical integer selected from an interval of [2, 5];
    dividing $EI_{under}$ into $$\left\lfloor \frac{W}{2^u} \right\rfloor \times \left\lfloor \frac{H}{2^v} \right\rfloor$$

non-overlapped image blocks with a size of $2^u \times 2^v$; then finding out underexposed image blocks from all image blocks of $EI_{under}$;
    forming all of the underexposed image blocks in $EI_{under}$ into an underexposed image area which is denoted as $R_{under}^{Exposure}$;
    (4) dividing $S_{HDR}$ into $$\left\lfloor \frac{W}{2^u} \right\rfloor \times \left\lfloor \frac{H}{2^v} \right\rfloor$$

non-overlapped image blocks with a size of $2^u \times 2^v$; then, according to $R_{over}^{Exposure}$ and $R_{under}^{Exposure}$, dividing $S_{HDR}$ into an easy overexposed area, an easy underexposed area and an easy normal-exposed area, which are respectively denoted as $R_{over}$, $R_{under}$ and $R_{normal}$;

(5) dividing $S_{TM}$ into $$\left\lfloor \frac{W}{2^u} \right\rfloor \times \left\lfloor \frac{H}{2^v} \right\rfloor$$

non-overlapped image blocks with a size of $2^u \times 2^v$; then denoting an area corresponding to $R_{over}$ in $S_{TM}$ as a tone-mapping easy overexposed area $R_1$; then denoting an area corresponding to $R_{under}$ in $S_{TM}$ as a tone-mapping easy underexposed area $R_2$; denoting an area corresponding to $R_{normal}$ in $S_{TM}$ as a tone-mapping easy normal-exposed area $R_3$;

(6) judging if there is overexposure in each of the image blocks in $R_1$, if yes, determining image blocks which are overexposed as tone-mapping overexposed blocks, then counting a total number of the tone-mapping overexposed blocks which is denoted as $N_{over}^{TM}$;

judging if there is underexposure in each of the image blocks in $R_2$, if yes, determining image blocks which are underexposed as tone-mapping underexposed blocks, then counting a total number of the tone-mapping underexposed blocks which is denoted as $N_{under}^{TM}$;

(7) according to $N_{over}^{TM}$ and $N_{under}^{TM}$, calculating an abnormal exposure rate of $S_{TM}$ which is denoted as $\eta_{abnormal}$, $$\eta_{abnormal} = \frac{N_{over}^{TM} + N_{under}^{TM}}{N_{R_1} + N_{R_2}};$$

wherein $N_{R_1}$ represents a total number of image blocks in $R_1$; $N_{R_2}$ represents a total number of image blocks in $R_2$;

(8) calculating an overexposed residual energy of $R_1$, which is denoted as $E_1$, wherein $$E_1 = \frac{\sum_{n=1}^{N_{R_1}} (\mu_{1,n} - L_{over}^E)^2}{N_{R_1}};$$

calculating an underexposed residual energy of $R_2$, which is denoted as $E_2$, wherein $$E_2 = \frac{\sum_{n'=1}^{N_{R_2}} (\mu_{2,n'} - L_{under}^E)^2}{N_{R_2}};$$

wherein $\mu_{1,n}$ represents an average value of pixel values of all pixels in a corresponding area of an nth image blocks in $R_1$ in an luminance component of $S_{TM}$; $\mu_{2,n'}$ represents an average value of pixel values of all pixels in a corresponding area of an n'th image blocks in $R_2$ in the luminance component of $S_{TM}$; $L_{over}^E$ is an extreme overexposure brightness value, $L_{over}^E = 255$; $L_{under}^E$ is an extreme underexposure brightness value, $L_{under}^E = 0$;

(9) converting $R_3$ from an RGB (red green blue) color space into an opponent color space, which is denoted as $R_3'$; then calculating an average value and a variance of a component value of a red-green channel of all pixels in $R_3'$; which are respectively denoted as $\mu_{rg}$ and $\sigma_{rg}$; calculating an average value and a variance of a component value of yellow-blue channel of all pixels in $R_3'$, which are respectively denoted as $\mu_{yb}$ and $\sigma_{yb}$; then calculating an exposure color index of $R_3'$, which is denoted as $C_3$, $C_3 = \sqrt{\sigma_{rg}^2 + \sigma_{yb}^2} + \omega_c \times \sqrt{\mu_{rg}^2 + \mu_{yb}^2}$; wherein $\omega_c$ represents weighing of an average color value;

(10) obtaining a characteristic vector of $S_{TM}$, which is denoted as $\overline{F_{TM}}$, $\overline{F_{TM}} = [\eta_{abnormal}, E_1, E_2, C_3]$, wherein symbol [ ] is a vector symbol;

(11) testing $\overline{F_{TM}}$ according to a support vector regression training model to obtain an objective quality evaluation predictive value of $S_{TM}$, which is denoted as $Q = f(X_{dis})$, $f(X_{dis}) = (V_{best})^T \varphi(X_{dis}) + b_{best}$; wherein $Q$ is a function of $X_{dis}$, $f(\ )$ is an expression form of function, $X_{dis}$ is inputting for representing $\overline{F_{TM}}$, $V_{best}$ and $b_{best}$ are an optimal weight vector and an optimal bias of the support vector regression training model, $(V_{best})^T$ is a transposition of $V_{best}$, $\varphi(X_{dis})$ is a linear function of $X_{dis}$.

2. The method for evaluating quality of a tone-mapping image based on exposure analysis, as recited in claim 1, wherein an obtaining process of $EI_{over}$ and $EI_{over}$ in the step (2) is: a pixel value of a pixel at a coordinate position of (x,y) in $EI_{over}$ is denoted as $EI_{over}(x,y)$, a pixel value of a pixel at a coordinate position of (x,y) in $EI_{under}$ is denoted as $EI_{under}(x,y)$, $EI_{over}(x,y) = \lfloor 2F_{over} \times I_{HDR}(x,y) \rfloor 1\gamma$, $EI_{under}(x,y) = \lfloor 2F_{under} \times I_{HDR}(x,y) \rfloor 1\gamma$, wherein $1 \leq x \leq W$, $1 \leq y \leq H$, symbol $\lfloor \ \rfloor$ is a floor operation symbol, $F_{over}$ represents a sunlight parameter corresponding to $EI_{over}$, $F_{over} = 8$, $F_{under}$ represents a sunlight parameter corresponding to $EI_{under}$, $F_{under} = 0$, $I_{HDR}(x,y)$ represents a pixel value of a pixel at a coordinate position of (x,y) in a luminance component $I_{HDR}$ of $S_{HDR}$, $\gamma$ is a gamma correction parameter.

3. The method for evaluating quality of a tone-mapping image based on exposure analysis, as recited in claim 1, wherein in the step (3), a specific process of finding out overexposed image blocks from all the image blocks of $EI_{over}$ is: for an ith image block in $EI_{over}$, calculating an average value of pixel values of all pixels in the ith image block, if the average value of pixel values of all pixels in the ith image block is greater than an overexposed threshold $TH_{over}$, the ith image block is determined as an overexposed image block; wherein $$1 \leq i \leq \left\lfloor \frac{W}{2^u} \right\rfloor \times \left\lfloor \frac{H}{2^v} \right\rfloor;$$

in the step (3), a specific process of finding out underexposed image blocks from all the image blocks of $EI_{under}$ is: for an ith image block in $EI_{under}$ calculating an average value of pixel values of all pixels in the ith image block, if the average value of pixel values of all pixels in the ith image block is smaller than an underexposed threshold $TH_{under}$, the ith image block is determined as an underexposed image block.

4. The method for evaluating quality of a tone-mapping image based on exposure analysis, as recited in claim 2, wherein in the step (3), a specific process of finding out overexposed image blocks from all the image blocks of $EI_{over}$ is: for an ith image block in $EI_{over}$, calculating an average value of pixel values of all pixels in the ith image block, if the average value of pixel values of all pixels in the ith image block is greater than an overexposed threshold $TH_{over}$, the ith image block is determined as an overexposed image block; wherein $$1 \le i \le \left\lfloor \frac{W}{2^u} \right\rfloor \times \left\lfloor \frac{H}{2^v} \right\rfloor;$$

in the step (3), a specific process of finding out underexposed image blocks from all the image blocks of $EI_{under}$ is: for an ith image block in $EI_{under}$ calculating an average value of pixel values of all pixels in the ith image block, if the average value of pixel values of all pixels in the ith image block is smaller than an underexposed threshold $TH_{under}$, the ith image block is determined as an underexposed image block.

5. The method for evaluating quality of a tone-mapping image based on exposure analysis, as recited in claim 3, wherein a value of the overexposed threshold is $TH_{over} = \alpha_{over} \times \overline{EI_{over}}$, a value of the underexposed threshold is $TH_{under} = \alpha_{under} \times \overline{EI_{under}}$; wherein $\alpha_{over}$ is an overexposed control factor, $\alpha_{over}=0.8$; $\overline{EI_{over}}$ represents the average value of the pixel values of all pixels in $EI_{over}$, $\alpha_{under}$ is an underexposed control factor, $\alpha_{under}=1.2$, $\overline{EI_{under}}$ represents the average value of the pixel values of all pixels in $EI_{under}$.

6. The method for evaluating quality of a tone-mapping image based on exposure analysis, as recited in claim 4, wherein a value of the overexposed threshold is $TH_{over} = \alpha_{over} \times \overline{EI_{over}}$, a value of the underexposed threshold is $TH_{under} = \alpha_{under} \times \overline{EI_{under}}$; wherein $\alpha_{over}$ is an overexposed control factor, $\alpha_{over}=0.8$; $\overline{EI_{over}}$ represents the average value of the pixel values of all pixels in $EI_{over}$, $\alpha_{under}$ is an underexposed control factor, $\alpha_{under}=1.2$, $\overline{EI_{under}}$ represents the average value of the pixel values of all pixels in $EI_{under}$.

7. The method for evaluating quality of a tone-mapping image based on exposure analysis, as recited in claim 5, wherein a determining process of $R_{over}$、$R_{under}$ and $R_{normal}$ in the step (4) comprising steps of:
(4)-1a: defining current image block to be processed in $S_{HDR}$ as a current image block;
(4)-1b: defining the current image block as an ith image block in $S_{HDR}$ which is denoted as $B_{HDR}^{i}$, wherein $$1 \le i \le \left\lfloor \frac{W}{2^u} \right\rfloor \times \left\lfloor \frac{H}{2^v} \right\rfloor;$$

(4)-1c: if $B_{over}^{i} \in R_{over}^{Exposure}$ and $B_{under}^{i} \notin R_{under}^{Exposure}$, determining $B_{HDR}^{i}$ as an easy overexposed block; if $B_{under}^{i} \in R_{under}^{Exposure}$ and $B_{over}^{i} \notin R_{over}^{Exposure}$, determining $B_{HDR}^{i}$ as an easy underexposed block; if $B_{over}^{i} \in R_{over}^{Exposure}$ and $B_{under}^{i} \in R_{under}^{Exposure}$, determining $B_{HDR}^{i}$ as an easy normal-exposed block; wherein $B_{over}^{i}$ represents an ith image blocks in $EI_{over}$, $B_{under}^{i}$ represents an ith image blocks in $EI_{under}$;
(4)-1d: taking a next image block to be processed in $S_{HDR}$ as a current image block, then returning to (4)-1b and performing continuously until all image blocks in $S_{HDR}$ are processed, then taking an area formed by all easy overexposed blocks in $S_{HDR}$ as an easy overexposed area $R_{over}$, taking an area formed by all easy underexposed blocks as in $S_{HDR}$ as an easy underexposed area $R_{under}$; and taking an area formed by all easy normal-exposed blocks in $S_{HDR}$ as an easy normal-exposed area $R_{normal}$.

8. The method for evaluating quality of a tone-mapping image based on exposure analysis, as recited in claim 6, wherein a determining process of $R_{over}$、$R_{under}$ and $R_{normal}$ in the step (4) comprising steps of:
(4)-1a: defining current image block to be processed in $S_{HDR}$ as a current image block;
(4)-1b: defining the current image block as an ith image block in $S_{HDR}$ which is denoted as $B_{HDR}^{i}$, wherein $$1 \le i \le \left\lfloor \frac{W}{2^u} \right\rfloor \times \left\lfloor \frac{H}{2^v} \right\rfloor;$$

(4)-1c: if $B_{over}^{i} \in R_{over}^{Exposure}$ and $B_{under}^{i} \notin R_{under}^{Exposure}$, determining $B_{HDR}^{i}$ as an easy overexposed block; if $B_{under}^{i} \in R_{under}^{Exposure}$ and $B_{over}^{i} \notin R_{over}^{Exposure}$, determining $B_{HDR}^{i}$ as an easy underexposed block; if $B_{over}^{i} \in R_{over}^{Exposure}$ and $B_{under}^{i} \in R_{under}^{Exposure}$, determining $B_{HDR}^{i}$ as an easy normal-exposed block; wherein $B_{over}^{i}$ represents an ith image blocks in $EI_{over}$, $B_{under}^{i}$ represents an ith image blocks in $EI_{under}$;
(4)-1d: taking a next image block to be processed in $S_{HDR}$ as a current image block, then returning to (4)-1b and performing continuously until all image blocks in $S_{HDR}$ are processed, then taking an area formed by all easy overexposed blocks in $S_{HDR}$ as an easy overexposed area $R_{over}$, taking an area formed by all easy underexposed blocks in $S_{HDR}$ as an easy underexposed area $R_{under}$; and taking an area formed by all easy normal-exposed blocks in $S_{HDR}$ as an easy normal-exposed area $R_{normal}$.

9. The method for evaluating quality of a tone-mapping image based on exposure analysis, as recited in claim 7, wherein in the step (6), a judging process of the tone-mapping overexposed block in $R_1$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped image blocks with a size of $2^u \times 2^v$, wherein an nth image blocks in $R_1$ is denoted as $R_{1,n}$, calculating an average value and a standard deviation of pixel values of all pixels in an image block corresponding to $R_{1,n}$ in a luminance component of $S_{TM}$, which are respectively denoted as $\mu_{1,n}$ and $\sigma_{1,n}$; if $\mu_{1,n} > 200$ and $\sigma_{1,n} < \sigma_{TM}$, $R_{1,n}$ is judged as a tone-mapping overexposed block; wherein $1 \le n \le N_{R_1}$, $N_{R_1}$ represents a total number of image blocks in $R_1$, $\sigma_{TM}$ represents a standard deviation of pixel values of all pixels in the luminance component of $S_{TM}$;
in the step (6), a judging process of the tone-mapping underexposed block in $R_2$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped image blocks with a size of $2^u \times 2^v$, wherein an n'th image blocks in $R_2$ is denoted as $R_{2,n'}$, calculating an average value and a standard deviation of pixel values of all pixels in an image block corresponding to $R_{2,n'}$ in a luminance component of $S_{TM}$, which are respectively denoted as $\mu_{2,n'}$ and $\sigma_{2,n'}$; if $\mu_{2,n'}<50$ and $\sigma_{2,n'}<\sigma_{TM}$, $R_{2,n'}$ is judged as a tone-mapping underexposed block; wherein $1\leq n'\leq N_{R_2}$, $N_{R_2}$ represents a total number of image blocks in $R_2$, $\sigma_{TM}$ represents the standard deviation of pixel values of all pixels in the luminance component of $S_{TM}$.

10. The method for evaluating quality of a tone-mapping image based on exposure analysis, as recited in claim 8, wherein in the step (6), a judging process of the tone-mapping overexposed block $R_1$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped image blocks with a size of $2^u \times 2^v$, wherein an nth image blocks in $R_1$ is denoted as $R_{1,n}$, calculating an average value and a standard deviation of pixel values of all pixels in an image block corresponding to $R_{1,n}$ in a luminance component of $S_{TM}$, which are respectively denoted as $\mu_{1,n}$ and $\sigma_{1,n}$; if $\mu_{1,n}>200$ and $\sigma_{1,n}<\sigma_{TM}$, $R_{1,n}$ is judged as a tone-mapping overexposed block; wherein $1\leq n\leq N_{R_1}$, $N_{R_1}$ represents a total number of image blocks in $R_1$, $\sigma_{TM}$ represents a standard deviation of pixel values of all pixels in the luminance component of $S_{TM}$;

in the step (6), a judging process of the tone-mapping underexposed block in $R_2$ comprising steps of: dividing a luminance component in $S_{TM}$ into $$\left\lfloor \frac{W}{2^u} \right\rfloor \times \left\lfloor \frac{H}{2^v} \right\rfloor$$

non-overlapped overlapped image blocks with a size of $2^u \times 2^v$, wherein an n'th image blocks in $R_2$ is denoted as $R_{2,n'}$, calculating an average value and a standard deviation of pixel values of all pixels in an image block corresponding to $R_{2,n'}$ in a luminance component of $S_{TM}$, which are respectively denoted as $\mu_{2,n'}$ and $\sigma_{2,n'}$; if $\mu_{2,n'}<50$ and $\sigma_{2,n'}<\sigma_{TM}$, $R_{2,n'}$ is judged as a tone-mapping underexposed block; wherein $1\leq n'\leq N_{R_2}$, $N_{R_2}$ represents a total number of image blocks in $R_2$, $\sigma_{TM}$ represents the standard deviation of pixel values of all pixels in the luminance component of $S_{TM}$.

11. The method for evaluating quality of a tone-mapping image based on exposure analysis, as recited in claim 9, wherein in the step (11), a process of obtaining a support vector regression training model comprises steps of:

(11)-1a: selecting $n_{test}$ high dynamic range images; then generating $N_{test}$ tone-mapping images by different tone-mapping operators; taking a set of the $N_{test}$ tone-mapping images as a training image set, which is denoted as $D_{test}$; then utilizing a subjective quality evaluation method to evaluate the tone-mapping images in $D_{test}$ to obtain a subjective quality evaluation score of each tone-mapping image in $D_{test}$; denoting a subjective quality evaluation score of an mth tone-mapping image in $D_{test}$ as $DMOS_m$; then obtaining a characteristic vector of each tone-mapping image in $D_{test}$ in an identical way as a process of the step (1) to (10), denoting a characteristic vector of an mth tone-mapping image in $D_{test}$ as $\overline{F_{test,m}}$; wherein $n_{test}>1$; $1\leq m\leq N_{test}$; $1\leq DMOS_m\leq 100$;

(11)-1b: training each subjective quality evaluation score and characteristic vector of all tone-mapping images in $D_{test}$ utilizing support vector regression, so as to make a regression function has a minimum error to the subjective quality evaluation scores through training, fitting to obtain an optimal weight vector $V_{best}$ and an optimal bias $b_{best}$; then obtaining a support vector regression training model utilizing $V_{best}$ and $b_{best}$.

12. The method for evaluating quality of a tone-mapping image based on exposure analysis, as recited in claim 10, wherein in the step (11), a process of obtaining a support vector regression training model comprises steps of:

(11)-1a: selecting $n_{test}$ high dynamic range images; then generating $N_{test}$ tone-mapping images by different tone-mapping operators; taking a set of the $N_{test}$ tone-mapping images as a training image set, which is denoted as $D_{test}$; then utilizing a subjective quality evaluation method to evaluate the tone-mapping images in $D_{test}$ to obtain a subjective quality evaluation score of each tone-mapping image in $D_{test}$; denoting a subjective quality evaluation score of an mth tone-mapping image in $D_{test}$ as $DMOS_m$; then obtaining a characteristic vector of each tone-mapping image in $D_{test}$ in an identical way as a process of the step (1) to (10), denoting a characteristic vector of an mth tone-mapping image in $D_{test}$ as $\overline{F_{test,m}}$; wherein $n_{test}>1$; $1\leq m\leq N_{test}$; $1\leq DMOS_m\leq 100$;

(11)-1b: training each subjective quality evaluation score and characteristic vector of all tone-mapping images in $D_{test}$ utilizing support vector regression, so as to make a regression function has a minimum error to the subjective quality evaluation scores through training, fitting to obtain an optimal weight vector $V_{best}$ and an optimal bias $b_{best}$; then obtaining a support vector regression training model utilizing $V_{best}$ and $b_{best}$.

* * * * *